Figure 5:
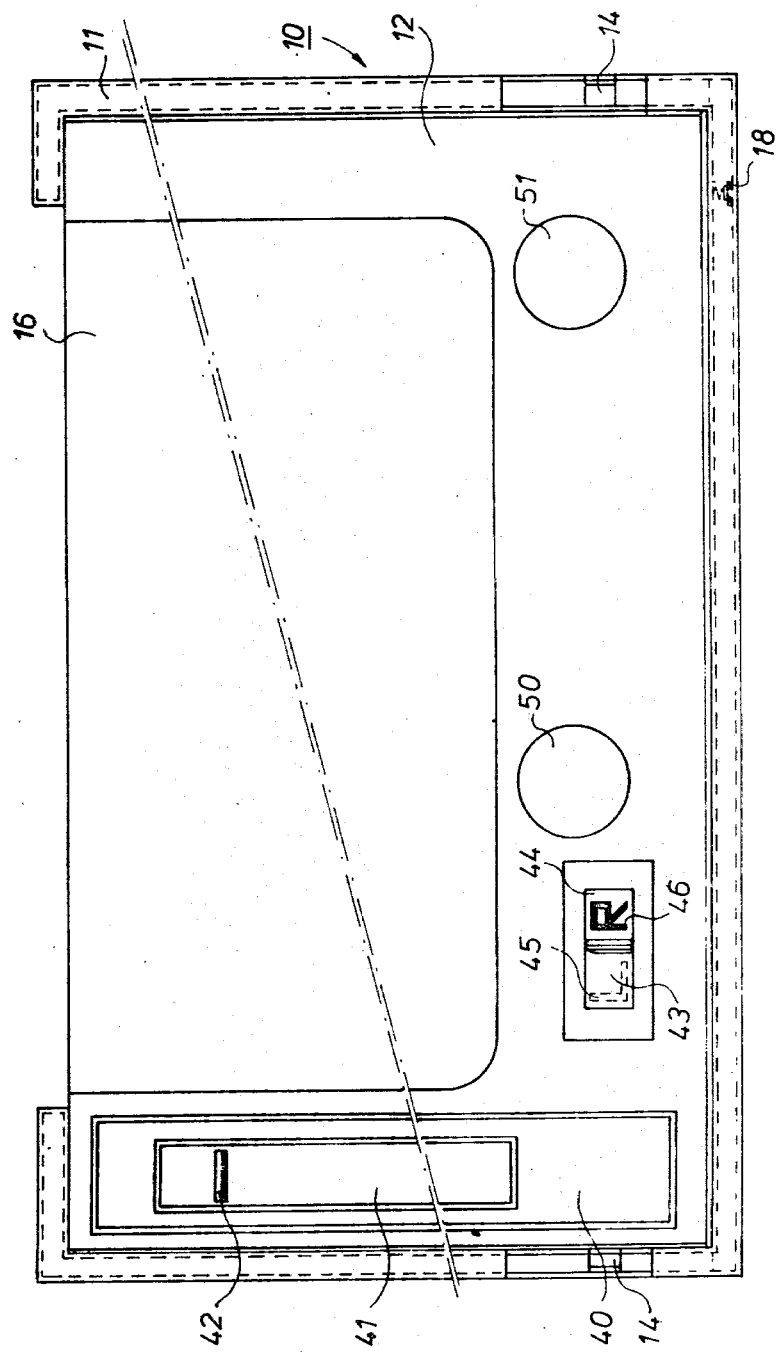

United States Patent [19]
Stievenart et al.

[11] 4,194,625
[45] Mar. 25, 1980

[54] RADIOGRAPHIC FILM CASSETTE

[75] Inventors: Emile F. Stievenart, Hoboken; Hendrik S. Plessers, Boechout; Georges J. Neujens, Merksem, all of Belgium

[73] Assignee: AGFA-GEVAERT N.V., Mortsel, Belgium

[21] Appl. No.: 943,399

[22] Filed: Sep. 18, 1978

Related U.S. Application Data

[63] Continuation of Ser. No. 808,174, Jun. 20, 1977, abandoned.

[30] Foreign Application Priority Data

Jun. 22, 1976 [GB] United Kingdom ............... 25949/76

[51] Int. Cl.² ...................... B65D 81/30; H05G 1/28; G03B 41/16
[52] U.S. Cl. .................. 206/455; 206/524.8; 250/468
[58] Field of Search ............ 206/455, 454, 456, 524.8; 250/468, 475, 480

[56] References Cited

U.S. PATENT DOCUMENTS

| | | | |
|---|---|---|---|
| 2,878,389 | 3/1959 | Raffman | 250/480 |
| 3,655,972 | 4/1972 | Somerset | 250/475 |
| 3,846,635 | 11/1974 | Shaffer | 250/480 |

*Primary Examiner*—William T. Dixson, Jr.
*Attorney, Agent, or Firm*—William J. Daniel

[57] ABSTRACT

A radiographic cassette comprises a bottom and a cover capable of being locked together. The cover has a part of its normally rigid structure replaced by a flexible foil which, when vacuum is aplied to the interior of the cassette, exerts a pressure upon the film/screen combination contained within the latter. In this way an intimate contact between the film and the screen is established and at the same time the distance between the film/screen combination and the object to be radiographed is reduced to a minimum due to the small thickness of the foil.

The cassette may be used in the field of high-definition radiography especially for mammography.

18 Claims, 6 Drawing Figures

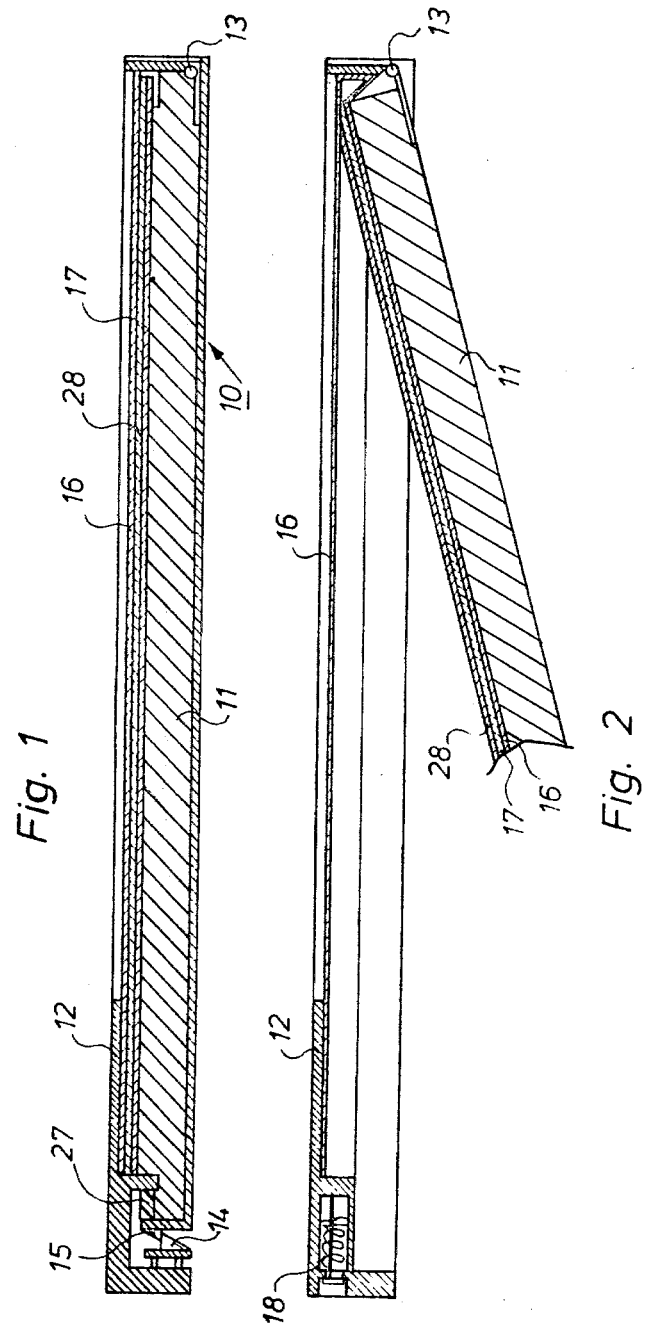

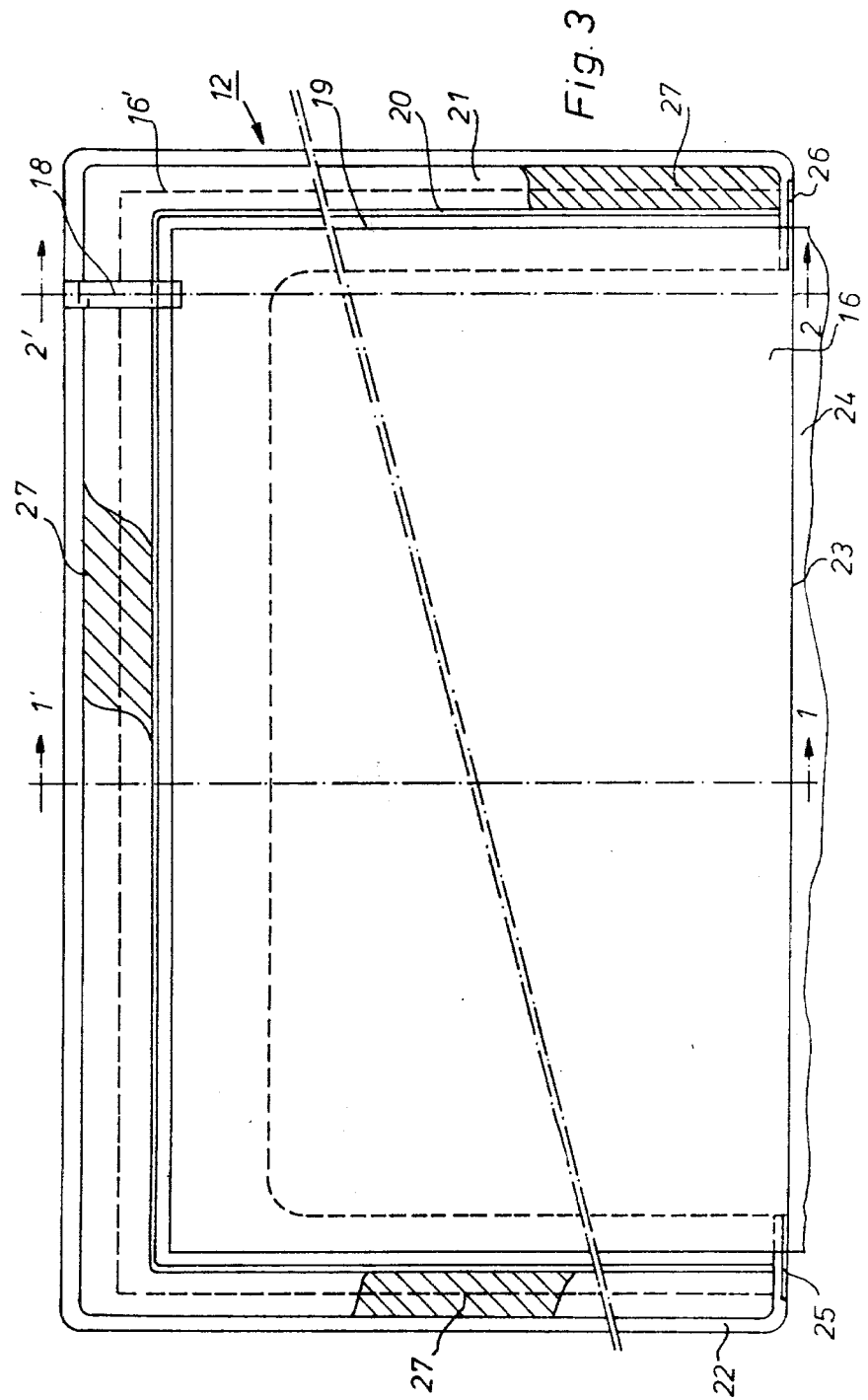

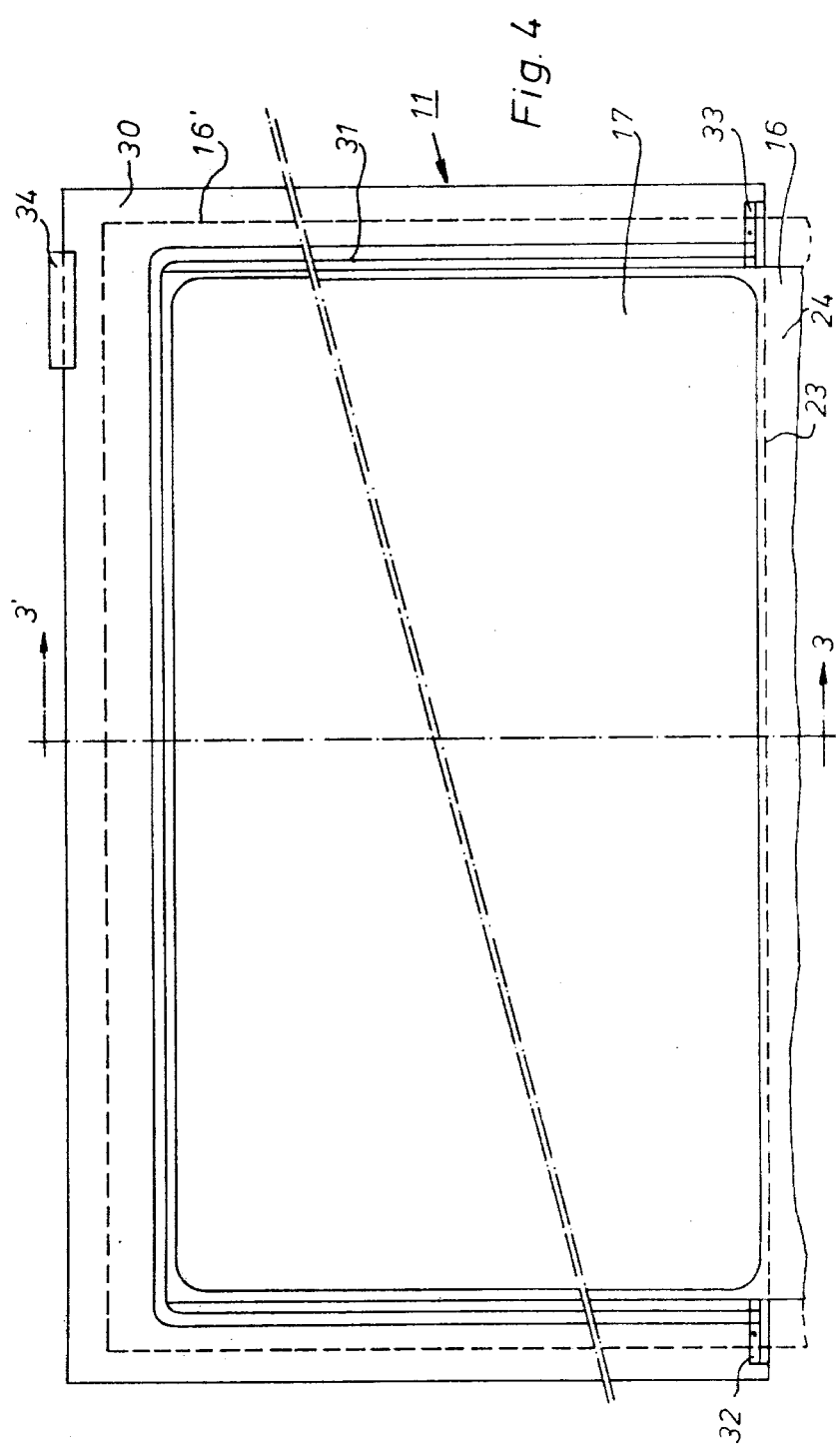

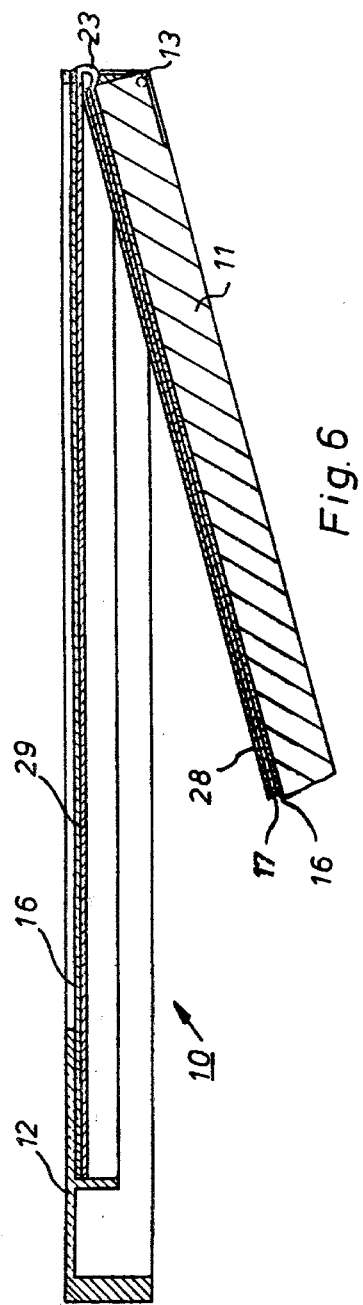

RADIOGRAPHIC FILM CASSETTE

This is a continuation of Ser. No. 808,174 filed June 20, 1977, now abandoned.

This invention relates to radiographic film cassettes and more particularly to radiographic film cassettes having improved sharpness characteristics.

Present day radiographic techniques in which great importance is attached to high resolving power of the recording cycle, require the use of so-called "soft" X-rays, which means that a relatively low voltage is applied to the X-ray source so that a radiation is obtained which is of a rather long wave-length.

In contrast to the use of a radiation of shorter wave-length (or harder X-radiation), the radiation absorption is more pronounced. The choice of the soft range in the radiographic spectrum results in that even small or thin irregularities produce such a decrease in radiation intensity that a clearly discerneable contrast upon the radiographic recording material is obtained after processing the latter.

An inconvenience of "soft" X-rays, however, resides in the fact that they are very liable to become scattered and that, therefore, extreme care must be taken in order to guarantee an intimate contact between the radiographic film and the fluorescent screen(s). Moreover, the distance between the film/screen sandwich and the object to be radiographed should be as small as possible.

In order to, at least partially, fulfil these requirements generally use is made of radiographic film cassettes of rather conventional design which, prior to exposure, are connected to a suitable source of vacuum so that an intimate contact between the film and fluorescent screen(s) is established as a result of the atmospheric pressure acting upon the cassette bottom and cover.

The design of this type of cassettes has the drawback that the cover, facing the source of radiation and which is usually made of metal, absorbs already a substantial part of the soft radiation, which results in the need for increasing the radiation dose. It must also be noted that the distance between the film/screen combination and the object to be radiographed is still considerable due to the thickness of the cassette cover.

Another method for locating the radiographic film during exposure consists in placing the recording material, whether or not accompanied by one or two fluorescent screens, in a light-tight bag of polymeric material and heat-sealing the bag while applying vacuum to the interior of it. In this way a thin radiographic recording unit is obtained which does not show a significant absorption in respect of the incident rays, and which at the same time, because the bag wall may be very thin permits the sandwich formed by the film/screen combination to be located very close to the object to be radiographed.

Unfortunately, when the bag is opened by means of a cutter, such as a pair of scissors, part of the useful area of the bag is always cut off, so that the number of times such a bag may be used is rather limited. Thereafter two or three exposures, the dimensions of the bag may have diminished to such an extent that it will no longer hold a film of a given format. The unavoidable flexure of the film/screen sandwich may also lead to difficulties with respect to a correct positioning. An analogous drawback may be noticed when employing radiographic film cassettes of classical design but which are made of a flexible material, such as polymer material.

It is therefore an object of the invention to provide a radiographic film cassette which is free of the inconveniences of the above mentioned prior art devices.

According to the invention, there is provided: A radiographic film cassette comprising a bottom and a cover hingedly connected to each other and fastening means, said bottom and said cover when closed and fastened form a light-tight enclosure in which a radiographic film sheet and screen can be accomodated, the cover being formed in part by a flexible foil which is transparent to penetrating radiation and extends over part of the plan area of the cassette, and in part by a less flexible marginal portion to which said foil is connected and that has a thickness that is greater than that of the flexible foil, and comprising at least one exhaust opening via which air can be aspirated from the interior of the closed and fastened cassette to cause atmospheric pressure to be exerted on said screen and film sandwich via said foil.

In the foregoing description, the phrase "plan area" of the cassette should be interpreted as denoting the area occupied by the closed cassete when viewed normally to the plane in which it holds a film sheet.

The word "cover" means that member which is turned towards the X-ray source and upon which the object to be radiographed is positioned.

A radiographic cassette of this design combines the advantages of a classical radiographic film cassette and the polymeric bag in that, on the one hand, it is undeformable due to the combined rigidity of the bottom and the cover as they are locked together and on the other hand the distance between the object to be radiographed and the sandwich of film/screen is limited to the thickness of the flexible foil only.

A preferred field of application of the cassette according to the invention is mammography techniques.

The cassette may be designed so that it can be fastened or unfastened automatically by mechanisms forming part of an automatic cassette loading and/or unloading apparatus, e.g. an apparatus which can operate in a well-lit room.

The latter possibility may be of importance when radiographic examinations are carried out by mobile teams which do not have available classical hospital facilities.

Preferably, the bottom of the cassette is provided with an intensifying screen.

In order to increase the efficiency of the vacuum, supplementary sealing expedients may be provided in the cassette, so that it is not necessary to maintain the source of vacuum in operation after a sufficiently low pressure has been established in the cassette. It will also be clear that the aspirating means may be equipped with means which provide or at least facilitate the atmospheric pressure restoration once the exposure has taken place. In fact the exposure cycle which comprises the loading of the cassette, the application of vacuum, the exposure itself, the release of the vacuum and the unloading of the cassette in a magazine or directly into a processing apparatus may be carried out fully automatically.

In a preferred embodiment, the flexible foil occupies at least 60% of the plan area of the cassette. The foil itself has a thickness of not more than 0.5 millimeter and is advantageously composed of a polymer material, preferably polyethylene, in which carbon black is dispersed as opacifying agent.

The cassette according to the invention may be designed in such a manner that it may cooperate with a gripping element located at the exposure station of a mammographic X-ray table, in which element also means are provided for automatically connecting the vacuum means with the vacuum valve of the cassette. In this way a reproducible positioning of the cassette is possible and in the meantime excessive time losses due to occasional bad connections are avoided.

The scope and spirit of the invention will be understood in a clearer way by reference to the following detailed description of a preferred embodiment and in the light of the accompanying drawings in which:

FIG. 1 is a longitudinal cross-sectional view according to the line 1—1' in FIG. 3 and 3—3' in FIG. 4 of a radiographic film cassette according to the invention, FIG. 2 is a longitudinal cross-sectional view according to the line 2—2' in FIG. 3 and 3—3' in FIG. 4 of a radiographic film cassette as illustrated in FIG. 4 (but including small structural variation) when the cassette is partly opened, FIG. 3 is an under-plan view of the cover, FIG. 4 is an under-plan view of the bottom, FIG. 5 is a top view of another embodiment of a cassette according to the invention and FIG. 6 is a cross-sectional view of an alternative embodiment of the cassette according to the invention.

As illustrated in FIGS. 1 and 2, the radiographic film cassette 10 according to the invention comprises a bottom 11 and a cover 12 which are hingedly connected to each other by hinges 13 (only one being shown). The cover 12 and the bottom 11 represented in the form of a sandwich structure in FIG. 1 may be made of a metal such as aluminium or of a polymeric material having a high degree of stiffness, and is so designed that its dimensions are sufficient for current format radiographic films and a introduction into in exposure apparatus. The bottom 11 bears an intensifying screen 17 which may be resiliently supported and which is intended to increase the yield of the conversion of penetrating radiation into a latent image built-up in the radiographic film contained in the cassette.

Part of the surface area of the cover 12 consists of a flexible foil 16 which is opaque to visible light but which transmits the penetrating radiation creating a latent image. The purpose of this foil 16 is to guarantee an optimum contact with the film 28 and the intensifying screen 17 so that scattering or other quality decreasing phenomena may be avoided to a large extent. This intimate contact is made possible by the application of a vacuum in the inner space of the cassette 10 after locking the latter with the help of locking mechanism 14, 15, so that the atmospheric pressure tends to flex the flexible foil 16, and that as a consequence a firm contact between the latter and the film 28 is established. In order to evacuate the inner space a usual vacuum valve 18 is provided in one of the corners of the cover frame 12 which valve may be connected to a suitable source of vacuum (not shown). In case the flexible foil 16 is connected with only the cover 12, the vacuum is maintained during the exposure. However the flexible foil can be extended to twice its original length for the cover alone (as especially illustrated in FIG. 2) so that the extended portion continues under the whole area of the intensifying screen 17, or supplementary sealing means as for example a strip of silicone rubber 27 (see again FIG. 1) can be provided, and in either case the connection to the vacuum source may be terminated once a sufficiently low pressure has been established with in the cassette. The good working of the cassette is already guaranteed when the vacuum within the inner space of the cassette attains 7000 mm of water column or less.

FIG. 3 is a bottom plan view of the cover 12 of the cassette. It comprises a rigid U-shaped member 19 which is provided with an upstanding ridge 20 which is capable of fitting in a corresponding groove (see FIG. 4) provided in the bottom 11 of the cassette. The flexible foil 16 of rectangular shape is secured to the U-shaped member 19 by known means such as adhesive, heat sealing, etc., over about three quarters of its periphery. The residual part 24 partly extends under the intensifying screen 17, and by closing the cassette a relatively air-tight unit is obtained.

The space 21 defined between the upstanding ridge 20 and the upstanding side wall 22 of the cover may be provided with supplementary sealing means 27 of resilient nature (only parts of said means have been illustrated for the sake of clearness). The area occupied by the flexible foil 16 is of such shape and dimensions that there is ample space in order to locate the object (for example a breast) to be radiographed in an easy manner, even after partly compressing the latter.

At the end of the legs of the U-shaped member 19, there are provided small recesses 25 and 26, which serve to house one element of the hinges 13 (see also FIG. 1).

The flexible foil 16 is made from a flexible polymeric foil such as polyethylene in which carbon black has been previously dispersed as opacifying agent.

FIG. 4 illustrates a top-plan view of the bottom 11.

It comprises a rigid plate 30 in which a groove 31 is provided, extending over about three quarters of its periphery and which serves for receiving the upstanding ridge 20 of the cover 12 (see FIG. 3). At the inside of the bottom 11, an intensifying screen 17 is provided which is mounted onto the inner surface of the plate 30 and the dimensions of said screen are about the same as the format of the radiographic film (not shown) which is to be exposed. If desired, a portion 24 of a bottom flexible foil 16b may, as shown, extend under said intensifying screen 17 in order to increase the air-tightness of the whole arrangement.

It will be clear that when providing a bottom flexible foil (which in FIGS. 3 and 4 is denoted by 16b) of a width exceeding the distance between opposite edges of the groove 31, as shown by dotted lines 16', the air-tightness reaches a very high accuracy since the margins of the flexible foil are urged into the space defined by the groove 31 of the bottom 11 and the ridge 20 of the cover 12, so forming a kind of air-tight bag when closing the cassette.

In the bottom 11 are also provided recesses 32 and 33 in which the second element of hinges 13 may be located.

As may be understood from the foregoing, when closing the cassette, the flexible foil 16 (or 16') is doubled upon itself in the region of edge 23.

A member 34 (see FIG. 4) which partly projects from the bottom 11 and fixedly connected therewith enables the bottom 11 to be engaged by means of an appropriate mechanism and to further open the cassette, once the locking/unlocking 14, 15 mechanism (FIG. 1) is in its unlocking position. This feature makes possible to incorporate the cassette according to the invention into known daylight loading/unloading systems or into daylight loading/unloading systems, especially adapted or designed for this type of cassette.

In FIG. 5 is illustrated a top view of another preferred embodiment of a cassette 10, according to the invention which is provided with supplementary features in order to increase its ergonomic properties. The cassette 10 comprises a bottom 11 (of which only the side edges may be seen) and a cover 12 which are hingingly connected with each other. Suitable locking means 14 are provided. In contrast to the cassette of FIG. 1, the locking means are located in the side walls of the cassette and may comprise a pin fixedly connected to the cover 12 and a yieldingly biased slot which is located on a rail or in a groove fixedly connected with the bottom 11 wherein the pin and slot are capable of engaging each other when exerting a pressure on the cover 12. As this locking/unlocking means is not part of the invention it has not been represented in detail. The cover 12 of which a part is formed by a flexible foil 16 is provided with means which permit the film to be provided with supplementary data related to the person or to the object to be radiographed.

So are provided first identification means 40,41,42 which enable to print additional information related to the person to be radiographed upon the film (not shown). The said identification means comprise a small chamber 40 in which a slide 41 is located and which slide 41, by pushing the knob 42 in downward direction, may perform a translational movement into the chamber 40, so providing a small rectangular opening in the cover 12. At that moment data carrying means (not shown) such as a small typewritten card may be placed into a special exposure unit (not shown) which, by means of a small light source, prints the data upon the film via the above mentioned opening in the cover. The slide 41 may be resiliently biased in the chamber 40, so that upon withdrawing the cassette 10 from the special exposure unit the slide 41 automatically closes again in a light-tight manner.

There are also provided second identification means for printing supplementary data upon the film during its exposure to penetrating radiation.

Especially in mammography in which generally two practically identical objects are radiographed, it is desirable to provide identification upon the film which positively indicates whether it is the left or the right breast which is represented on the radiographic record.

As such, symbols 45 or 46 provided on a slide 43 and associated with respectively the left or right side of the patient are fixedly located in the cover 12 of the cassette. The slide 43 made of a material opaque to penetrating radiation and having an opening 44 may take a dual position in that the opening 44 may be positioned either over the symbol 45 or over the symbol 46.

The symbols 45 and 46, which are made of a penetrating radiation absorbing material, such as lead, intercept the radiation during exposure, so that after processing the film a white area in the form of the symbol is obtained thereon. The circles 50 and 51 represent the areas on which cover lifting means (such as sucker cups) may be located for opening the cassette when the latter is incorporated into or forms part of a daylight loading/unloading system.

Finally, FIG. 6 shows an alternative embodiment of the cassette 10 of FIG. 1, in which a second intensifying screen 29 is connected to the flexible foil 16 on the cover 12. This second intensifying screen 29 contributes positively to a substantial decrease of the radiation dose by the fact that the radiographic film 28, having in general a penetrating radiation sensitive coating on either side, will be exposed to the light emitted by both intensifying screens 17 and 29, which means that the radiation dose may practically be halved.

The second intensifying screen 29 may be secured to the flexible foil 16 by known means such as pressure adhesive tape. If desired, the side of the flexible foil 16 facing the inner space of the cassette itself may be provided with a fluorescent coating, so that the use of a separate support for this coating may be dispensed with.

We claim:

1. A radiographic film cassette comprising a bottom, a cover frame which is U-shape in plan, having three side members with the remaining side being devoide of a side member between the free ends of the two opposite side members, and defines an open area therewithin, hinge means hingedly connecting the free ends of said two opposite frame side members to said bottom, fastening means for securing said cover frame in closed position to said bottom, said U-shaped cover frame making with said bottom when in closed position a light-tight seal around its three side members, and a light-opaque radiation-penetrable flexible foil arranged in said cover frame at least coextensive with the open area thereof and having margins along three sides secured between said bottom and said cover frame side members when the latter are in closed position, said flexible foil on its remaining side projecting outside said open space beyond the limits of the free ends of said cover frame side members and extending continuously onto said bottom so as to form when said cover frame and bottom are in closed position a re-entrant fold stretching between the free ends of said two opposite side members of said cover proximate to the adjacent side of said bottom and closing the remaining side of the cassette against entry by light, whereby a radiographic film sheet can be disposed within said cassette with an edge proximate to said re-entrant fold in said foil and exposed without obstruction to the limits of said folded foil.

2. A radiographic cassette according to claim 1, in which said bottom carries a first intensifying screen.

3. A radiographic film cassette according to claim 1, in which one of said cover frame and said bottom along the surfaces facing each other are provided with a ridge-like projection and the other with a groove-like recess for receiving said ridge-like projection when the cassette is in closed condition.

4. A radiographic film cassette according to claim 3, in which the ridge-like projection is carried by said cover frame and the other edge of said rigid frame is spaced away from said projection to define a peripheral channel and said channel contains a resilient, air-tight material.

5. A radiographic film cassette according to claim 4, in which said material is a silicone rubber.

6. A radiographic film cassette according to claim 1, in which said inner open space has a rectangular configuration.

7. A radiographic film cassette according to claim 6, in which said flexible foil formed of a polymeric material.

8. A radiographic film cassette according to claim 7, in which said polymeric material is polyethylene containing carbon black.

9. A radiographic film cassette according to claim 1, wherein said foil covers at least 60% of the plan area of the cassette.

10. A radiographic film cassette according to claim 1, wherein said foil has a thickness of not more than 0.5 millimeter.

11. A radiographic film cassette according to claim 3, in which said flexible foil has a width exceeding the width between the engaging projection and recess.

12. A radiographic film cassette according to claim 1 which comprises in addition an intensifying screen which contacts that side of said flexible foil which faces the interior of said cassette.

13. A radiographic film cassette according to claim 12, in which said intensifying screen is in the form of a coating on said flexible foil.

14. A radiographic film cassette according to claim 12, in which said intensifying screen is in the form of a coating on a separate support, which support is secured to said flexible foil.

15. A radiographic film cassette according to claim 1 which further comprises first identification means in order to print additional information on the film contained in said cassette.

16. A radiographic film cassette according to claim 14, in which said first identification means comprise an opening of generally rectangular form in the cover and closure means for closing said opening, and via which opening data from outside the cassette may be projected onto a radiographic film contained in the latter.

17. A radiographic film cassette according to claim 16 in which there are also provided second identification means in order to permit additional information to be printed on the film.

18. A radiographic film cassette according to claim 17, in which said second identification means comprise at least one significant symbol in penetrating radiation opaque material, said significant symbol being capable to be screened off from or exposed to the beam of penetrating radiation during exposure, so preventing or enabling the formation of a latent image said radiographic film.

* * * * *